United States Patent
Bell, Jr. et al.

(10) Patent No.: US 7,926,889 B2
(45) Date of Patent: Apr. 19, 2011

(54) HILL HOLD FOR AN ELECTRIC VEHICLE

(75) Inventors: Oliver A. Bell, Jr., Aiken, SC (US); Warren Clark, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 726 days.

(21) Appl. No.: 11/926,837

(22) Filed: Oct. 29, 2007

(65) Prior Publication Data

US 2009/0107740 A1    Apr. 30, 2009

(51) Int. Cl.
   *B60T 8/64*   (2006.01)
(52) U.S. Cl. ......................................... 303/191; 318/372
(58) Field of Classification Search .................. 303/191, 303/192; 180/65.1; 318/372, 376
   See application file for complete search history.

(56) References Cited

U.S. PATENT DOCUMENTS

| | | |
|---|---|---|
| 4,130,172 A | 12/1978 | Moody |
| 4,295,687 A | 10/1981 | Becker et al. |
| 4,347,907 A | 9/1982 | Downing, Jr. |
| 4,378,855 A | 4/1983 | Haub et al. |
| 4,673,852 A | 6/1987 | Geiger et al. |
| 4,687,976 A | 8/1987 | Shimizu et al. |
| 4,694,210 A | 9/1987 | Elliott et al. |
| 4,698,562 A | 10/1987 | Gale et al. |
| 4,763,053 A | 8/1988 | Rabe et al. |
| 4,800,977 A | 1/1989 | Boegli et al. |
| 4,809,803 A | 3/1989 | Ahern et al. |
| 4,817,748 A | 4/1989 | Murata et al. |
| 4,843,268 A | 6/1989 | Hovorka |
| 4,884,649 A | 12/1989 | Onishi et al. |
| 4,905,544 A | 3/1990 | Ganoung |
| 4,934,472 A | 6/1990 | Bloor et al. |
| 4,951,769 A | 8/1990 | Kawamura et al. |
| 5,004,080 A | 4/1991 | Wada et al. |
| 5,034,670 A | 7/1991 | Tominaga et al. |
| 5,079,488 A | 1/1992 | Harms et al. |
| 5,092,417 A | 3/1992 | Oslapas |
| 5,096,011 A | 3/1992 | Oslapas |
| 5,099,186 A | 3/1992 | Rippel et al. |

(Continued)

FOREIGN PATENT DOCUMENTS

EP   0439723 A2   8/1991

(Continued)

OTHER PUBLICATIONS

UK Intellectual Property Office Combined Search and Examination Report for Patent Application No. GB 0725043.4, dated Mar. 18, 2008.

*Primary Examiner* — Christopher P Schwartz

(74) *Attorney, Agent, or Firm* — Harness, Dickey & Pierce, P.L.C.

(57) ABSTRACT

A method for braking an electric utility vehicle including a motor and an electromechanical brake. The method includes storing a value indicative of at least one of an amount of current, voltage, and power that is commanded to a motor of the electric utility vehicle to maintain the electric utility vehicle in a stopped state; engaging a parking brake function of an electromechanical brake after the storing; disabling the motor after the engaging; commanding the at least one of the current, voltage, and power to the motor at the stored value when an accelerator pedal is depressed; and disengaging the parking brake function after the commanding.

7 Claims, 2 Drawing Sheets

U.S. PATENT DOCUMENTS

| | | |
|---|---|---|
| 5,101,924 A | 4/1992 | Yamagiwa et al. |
| 5,151,641 A | 9/1992 | Shamoto et al. |
| 5,172,784 A | 12/1992 | Varela, Jr. |
| 5,192,899 A | 3/1993 | Simpson et al. |
| 5,200,661 A | 4/1993 | Shramo et al. |
| 5,219,034 A | 6/1993 | Wortham |
| 5,222,572 A | 6/1993 | Yamagiwa et al. |
| 5,258,697 A | 11/1993 | Ford et al. |
| 5,280,211 A | 1/1994 | Freise et al. |
| 5,294,853 A | 3/1994 | Schluter et al. |
| 5,310,016 A | 5/1994 | Rudelle et al. |
| 5,349,535 A | 9/1994 | Gupta |
| 5,355,749 A | 10/1994 | Obara et al. |
| 5,365,153 A | 11/1994 | Fujita et al. |
| 5,365,431 A | 11/1994 | Minezawa et al. |
| 5,406,154 A | 4/1995 | Kawaguchi et al. |
| 5,409,074 A | 4/1995 | Wilson et al. |
| 5,419,406 A | 5/1995 | Kawamoto et al. |
| 5,432,383 A | 7/1995 | Kawamura et al. |
| 5,438,228 A | 8/1995 | Couture et al. |
| 5,449,962 A | 9/1995 | Shichijyo et al. |
| 5,460,234 A | 10/1995 | Matsuura et al. |
| 5,465,806 A | 11/1995 | Higasa et al. |
| 5,471,384 A | 11/1995 | Nakashima et al. |
| 5,473,233 A | 12/1995 | Stull et al. |
| 5,480,220 A | 1/1996 | Kumar |
| 5,487,438 A | 1/1996 | Kinoshita et al. |
| 5,489,003 A | 2/1996 | Ohyama et al. |
| 5,492,192 A | 2/1996 | Brooks et al. |
| 5,501,292 A | 3/1996 | Kawashima et al. |
| 5,504,378 A | 4/1996 | Lindberg et al. |
| 5,532,671 A | 7/1996 | Bachman et al. |
| 5,549,172 A | 8/1996 | Mutoh et al. |
| 5,559,381 A | 9/1996 | Bosley et al. |
| 5,562,178 A | 10/1996 | Worden et al. |
| 5,567,991 A | 10/1996 | Schantz et al. |
| 5,573,090 A | 11/1996 | Ross |
| 5,583,406 A | 12/1996 | Mutoh et al. |
| 5,586,613 A | 12/1996 | Ehsani |
| 5,615,933 A | 4/1997 | Kidston et al. |
| 5,619,085 A | 4/1997 | Shramo |
| 5,629,603 A | 5/1997 | Kinoshita et al. |
| 5,633,544 A | 5/1997 | Toida et al. |
| 5,669,470 A | 9/1997 | Ross |
| 5,672,920 A | 9/1997 | Donegan et al. |
| 5,678,646 A | 10/1997 | Fliege et al. |
| 5,678,760 A | 10/1997 | Muso et al. |
| 5,690,185 A | 11/1997 | Sengel |
| 5,696,680 A | 12/1997 | Ichioka et al. |
| 5,707,115 A | 1/1998 | Bodie et al. |
| 5,710,699 A | 1/1998 | King et al. |
| 5,711,388 A | 1/1998 | Davies et al. |
| 5,730,675 A | 3/1998 | Yamaguchi et al. |
| 5,744,895 A | 4/1998 | Seguchi et al. |
| 5,789,824 A | 8/1998 | Selfors et al. |
| 5,789,825 A | 8/1998 | Selfors et al. |
| 5,789,877 A | 8/1998 | Yamada et al. |
| 5,793,175 A * | 8/1998 | Journey ........................ 318/493 |
| 5,796,224 A | 8/1998 | Hayashi et al. |
| 5,801,498 A | 9/1998 | Kusano et al. |
| 5,804,973 A | 9/1998 | Shinohara et al. |
| 5,807,205 A | 9/1998 | Odaka et al. |
| 5,808,428 A | 9/1998 | Ito et al. |
| 5,814,957 A | 9/1998 | Yoshida et al. |
| 5,823,280 A | 10/1998 | Lateur et al. |
| 5,828,554 A | 10/1998 | Donegan et al. |
| 5,836,412 A | 11/1998 | Lyles et al. |
| 5,877,573 A | 3/1999 | Oberheide |
| 5,877,601 A | 3/1999 | Obara et al. |
| 5,901,801 A | 5/1999 | Toida et al. |
| 5,903,112 A | 5/1999 | Yamada et al. |
| 5,903,113 A | 5/1999 | Yamada et al. |
| 5,905,346 A | 5/1999 | Yamada et al. |
| 5,914,575 A | 6/1999 | Sasaki et al. |
| 5,915,495 A | 6/1999 | Kerlin et al. |
| 5,917,248 A | 6/1999 | Seguchi et al. |
| 5,923,096 A | 7/1999 | Manak |
| 5,924,511 A | 7/1999 | Takata et al. |
| 5,941,328 A | 8/1999 | Lyons et al. |
| 5,944,132 A | 8/1999 | Davies et al. |
| 5,960,901 A | 10/1999 | Hanagan |
| 5,973,463 A | 10/1999 | Okuda et al. |
| 5,982,067 A | 11/1999 | Sebastian et al. |
| 5,991,683 A | 11/1999 | Takaoka et al. |
| 5,994,789 A | 11/1999 | Ochiai et al. |
| 6,002,221 A | 12/1999 | Ochiai et al. |
| 6,013,963 A | 1/2000 | Shelton, Jr. |
| 6,028,402 A | 2/2000 | Kumar et al. |
| 6,034,460 A | 3/2000 | Tajima et al. |
| 6,098,735 A | 8/2000 | Sadarangani et al. |
| 6,100,615 A | 8/2000 | Birkestrand |
| 6,107,761 A | 8/2000 | Seto et al. |
| 6,111,390 A | 8/2000 | Inaba et al. |
| 6,119,800 A | 9/2000 | McComber |
| 6,138,629 A | 10/2000 | Masberg et al. |
| 6,144,125 A | 11/2000 | Birkestrand et al. |
| 6,155,369 A | 12/2000 | Whittaker |
| 6,166,499 A | 12/2000 | Kanamori et al. |
| 6,183,389 B1 | 2/2001 | Tabata et al. |
| 6,194,799 B1 | 2/2001 | Miekka et al. |
| 6,209,672 B1 | 4/2001 | Severinsky |
| 6,218,804 B1 | 4/2001 | Toriyama et al. |
| 6,226,582 B1 | 5/2001 | Adsett et al. |
| 6,234,930 B1 | 5/2001 | Kaneko et al. |
| 6,236,172 B1 | 5/2001 | Obara et al. |
| 6,242,873 B1 | 6/2001 | Drozdz et al. |
| 6,244,427 B1 | 6/2001 | Syverson |
| 6,252,331 B1 | 6/2001 | Mildice et al. |
| 6,255,798 B1 | 7/2001 | Obara et al. |
| 6,258,001 B1 | 7/2001 | Wakuta et al. |
| 6,269,895 B1 | 8/2001 | Tanuguchi et al. |
| 6,278,256 B1 | 8/2001 | Aoyama et al. |
| 6,328,123 B1 | 12/2001 | Niemann et al. |
| 6,333,610 B1 | 12/2001 | Meschik et al. |
| 6,342,769 B1 | 1/2002 | Birkestrand et al. |
| 6,351,050 B1 | 2/2002 | Coles et al. |
| 6,369,532 B2 | 4/2002 | Koenen et al. |
| 6,373,162 B1 | 4/2002 | Liang et al. |
| 6,373,206 B1 | 4/2002 | Morimoto et al. |
| 6,396,183 B1 | 5/2002 | Tajima et al. |
| 6,412,882 B1 | 7/2002 | Isono et al. |
| 6,422,001 B1 | 7/2002 | Sherman et al. |
| 6,424,157 B1 | 7/2002 | Gollomp et al. |
| 6,425,365 B1 | 7/2002 | Peters et al. |
| 6,429,613 B2 | 8/2002 | Yanase et al. |
| 6,434,475 B2 | 8/2002 | Kaneko et al. |
| 6,443,543 B1 | 9/2002 | Chiang |
| 6,456,909 B1 | 9/2002 | Shimada et al. |
| 6,459,962 B2 | 10/2002 | Ulrich et al. |
| 6,464,026 B1 | 10/2002 | Horsley et al. |
| 6,469,462 B2 | 10/2002 | Shimane et al. |
| 6,476,571 B1 | 11/2002 | Sasaki et al. |
| 6,478,101 B1 | 11/2002 | Taniguchi et al. |
| 6,479,917 B2 | 11/2002 | Yamazaki et al. |
| 6,492,785 B1 | 12/2002 | Kasten et al. |
| 6,538,400 B2 | 3/2003 | Fowler et al. |
| 6,541,938 B2 | 4/2003 | Okamura et al. |
| 6,554,088 B2 | 4/2003 | Severinsky et al. |
| 6,556,460 B2 | 4/2003 | Ishida et al. |
| 6,598,693 B2 | 7/2003 | Honda et al. |
| 6,600,249 B2 | 7/2003 | Nelson et al. |
| 6,625,525 B2 | 9/2003 | Yoshino et al. |
| 6,626,504 B2 | 9/2003 | Harner et al. |
| 6,630,764 B1 | 10/2003 | Dube et al. |
| 6,636,788 B2 | 10/2003 | Tamagawa et al. |
| 6,647,325 B2 | 11/2003 | Shimazaki et al. |
| 6,651,762 B1 | 11/2003 | Hokanson et al. |
| 6,661,109 B2 | 12/2003 | Fukasaku et al. |
| 6,679,346 B2 | 1/2004 | Raftari et al. |
| 6,917,180 B2 | 7/2005 | Harrison et al. |
| 6,963,186 B2 | 11/2005 | Hobbs |
| 6,973,880 B2 | 12/2005 | Kumar |
| 7,056,260 B2 | 6/2006 | Nakamori et al. |
| 2002/0024267 A1 | 2/2002 | Sakamoto |
| 2002/0103055 A1 | 8/2002 | Tani et al. |
| 2002/0171324 A1 | 11/2002 | Smith et al. |
| 2003/0117096 A1 | 6/2003 | Gagnon et al. |

| | | | | | | |
|---|---|---|---|---|---|---|
| 2003/0136597 A1 | 7/2003 | Raftari et al. | | 2005/0236207 A1 | 10/2005 | Gratzer |
| 2004/0056616 A1 | 3/2004 | Honda | | 2007/0222288 A1* | 9/2007 | Kikuchi et al. ............... 303/151 |
| 2004/0100221 A1 | 5/2004 | Fu | | | | |
| 2004/0103719 A1 | 6/2004 | Raftari et al. | | FOREIGN PATENT DOCUMENTS | | |
| 2004/0104619 A1 | 6/2004 | Manaka | | GB | 2331337 A | 5/1999 |
| 2004/0169489 A1 | 9/2004 | Hobbs | | WO | 2006025217 A1 | 3/2006 |
| 2004/0204285 A1 | 10/2004 | Ueno | | | | |
| 2005/0211478 A1* | 9/2005 | Sakuma et al. .............. 180/65.1 | | * cited by examiner | | |

HILL HOLD FOR AN ELECTRIC VEHICLE

FIELD

The present disclosure relates to providing braking and acceleration for electric utility vehicles on a hill.

BACKGROUND

The statements in this section merely provide background information related to the present disclosure and may not constitute prior art.

Utility vehicles, such as maintenance vehicles, cargo vehicles, shuttle vehicles, and golf cars can experience vehicle roll-back events during idle periods while positioned on a hill. More specifically, if the utility vehicle is idling on a surface that has a sufficient grade, the utility vehicle can be induced to roll backward once an accelerator pedal is depressed and a parking brake is released. Rather than providing a smooth start forward, there can be an initial backward movement down the hill.

Typically, in an electric utility vehicle this occurs when the motor current is not sufficient to maintain the position of the vehicle when the parking brake is released. In some cases, the limited motor current results from limited dynamic braking capability at low speeds. In other cases, the limited motor current results from a time delay for a pulse width modulated signal to build up from zero to a point that dynamic braking can occur.

SUMMARY

Accordingly, a method for braking an electric utility vehicle including a motor and an electromechanical brake is provided. The method includes storing a value indicative of at least one of an amount of current, voltage, and power that is commanded to a motor of the electric utility vehicle to maintain the electric utility vehicle in a stopped state; engaging a parking brake function of an electromechanical brake after the storing; disabling the motor after the engaging; commanding the at least one of the current, voltage, and power to the motor at the stored value when an accelerator pedal is depressed; and disengaging the parking brake function after the commanding.

In other features, a system for controlling dynamic braking of an electric utility vehicle is provided. The system includes a brake pedal position sensor, that generates a brake position signal corresponding to a position of a brake pedal. An accelerator position sensor generates an accelerator signal corresponding to a position of an accelerator pedal. A controller receives the brake position signal and the accelerator signal and provides a motor control signal to a motor based on the brake position signal and the accelerator pedal signal. The controller stores a value indicative of an amount of at least one of current, voltage, and power when the electric utility vehicle achieves a first predetermined speed. The controller generates the motor control signal in accordance with the stored value when the accelerator signal indicates a command to increase the speed of the electric utility vehicle above a second predetermined speed.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present disclosure in any way.

DETAILED DESCRIPTION

Figure 1:
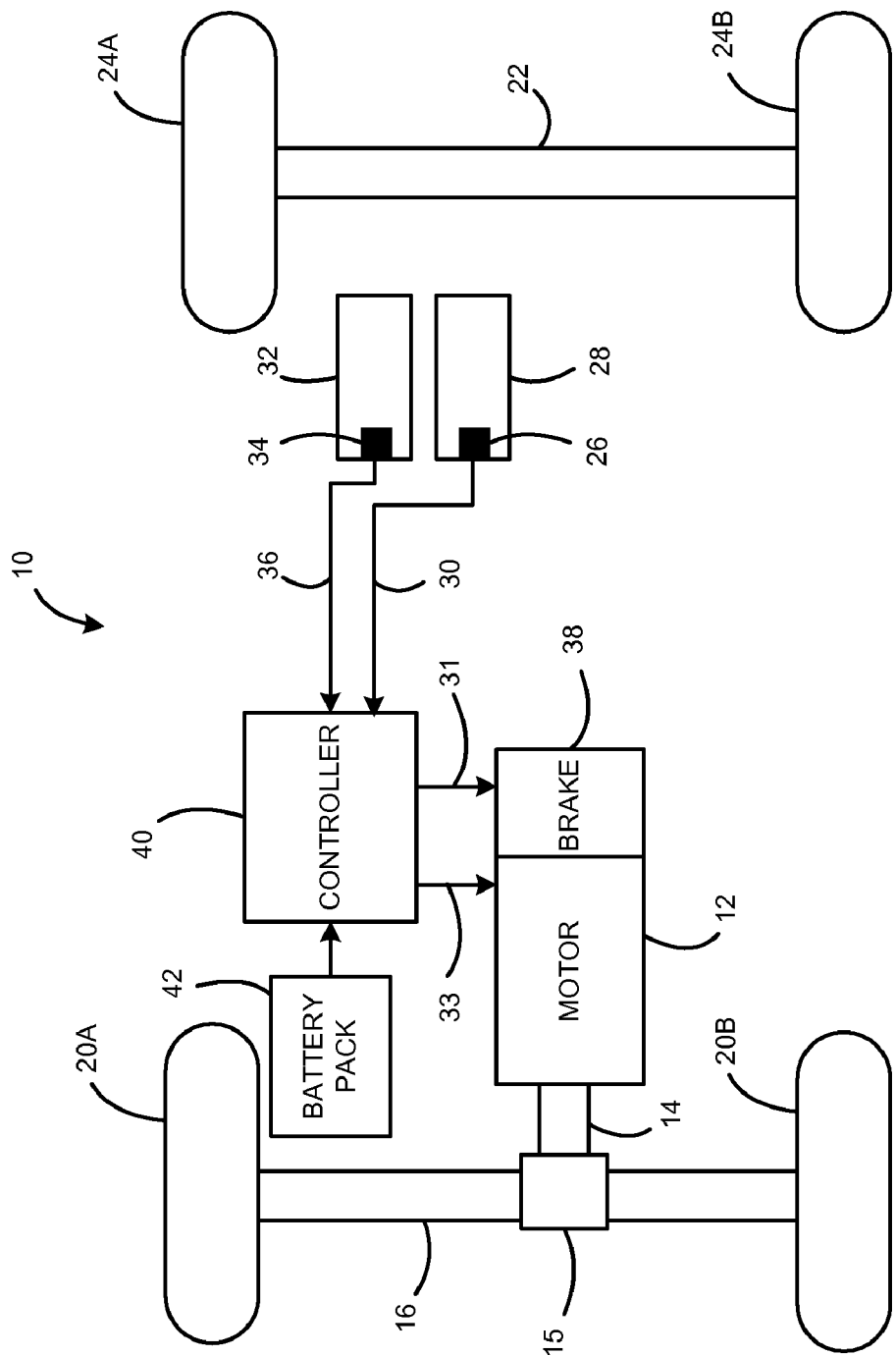
FIG. 1 is a block diagram illustrating an electric utility vehicle including a hill hold system in accordance with various embodiments.

The following description is merely exemplary in nature and is in no way intended to limit the present disclosure, application, or uses. For purposes of clarity, like reference numbers will be used in the drawings to identify like elements.

FIG. 1 is a block diagram illustrating a non-limiting, exemplary electric utility vehicle 10, including a hill hold system, in accordance with various embodiments. A motor 12 couples through an output shaft 14, such as a spline shaft, to an input, such as an input shaft, of a rear axle 16. Motor 12 can be any known electrical motor, generator, or motor generator technology, including, but not limited to AC induction machines, DC machines, synchronous machines, and switched reluctance machines. A differential 15 drives rear axle shafts 16 to drive rear driven wheels 20A and 20B. A front axle shaft 22 is coupled to front non-driven wheels 24A and 24B.

An accelerator assembly includes at least one accelerator position sensor 26 and an accelerator pedal 28. Accelerator position sensor 26 generates an accelerator signal 30 based on a sensed position of accelerator pedal 28. A brake pedal assembly includes a brake pedal 32 and a brake position sensor 34. Brake pedal position sensor 34 generates a brake signal 36 based on a sensed position of brake pedal 32. An electromechanical brake 38 couples to motor 12. A controller 40 controls electromechanical brake 38 as it acts on motor 12 based on brake signal 36.

More specifically, during drive conditions, electromechanical brake 38 can be powered by controller 40 to a released position where no braking force is applied to motor 12. When brake pedal 32 is depressed, brake pedal position sensor 34 determines a position of brake pedal 32 to vary the electrical energy applied to electromechanical brake 38 via a brake control signal 31. When brake pedal 32 is depressed to within a selectable percentage of a maximum brake pedal stroke, power to electromechanical brake 38 can be interrupted to actuate a parking or emergency brake function of the electromechanical brake 38. Details of the actuation of the parking brake function while on a hill will be discussed further below. To actuate the parking brake function, power can be removed from electromechanical brake 38 and a friction material can be spring applied to a disk of electromechanical brake 38. The springs of electromechanical brake 38 can be sized to apply a pressure to the friction material so as to provide a braking torque equal to or greater than a motor maximum dynamic torque. This action reduces the speed of motor 12 toward zero until electric utility vehicle 10 reaches zero speed or until brake pedal 32 is released.

Controller 40 can also regulate voltage, current, or power provided to motor 12 by a battery pack 42 based on at least one of accelerator signal 30 and brake signal 36. Battery pack 42 can include any known battery technology, including but not limited to lead acid, lithium ion, and lithium polymer batteries. As can be appreciated, controller 40 can be any known microprocessor, controller, or combination thereof known in the art. In various embodiments, controller 40 includes a microprocessor having read only memory (ROM), random access memory (RAM), and a central processing unit (CPU). Microprocessor can include any number of software control modules or algorithms that provide the functionality for the hill hold application of electric utility vehicle 10. In various other embodiments, controller 40 is an application specific integrated circuit (ASIC), an electronic circuit, a combinational logic circuit or other suitable components that provide the hill hold functionality.

Figure 2:
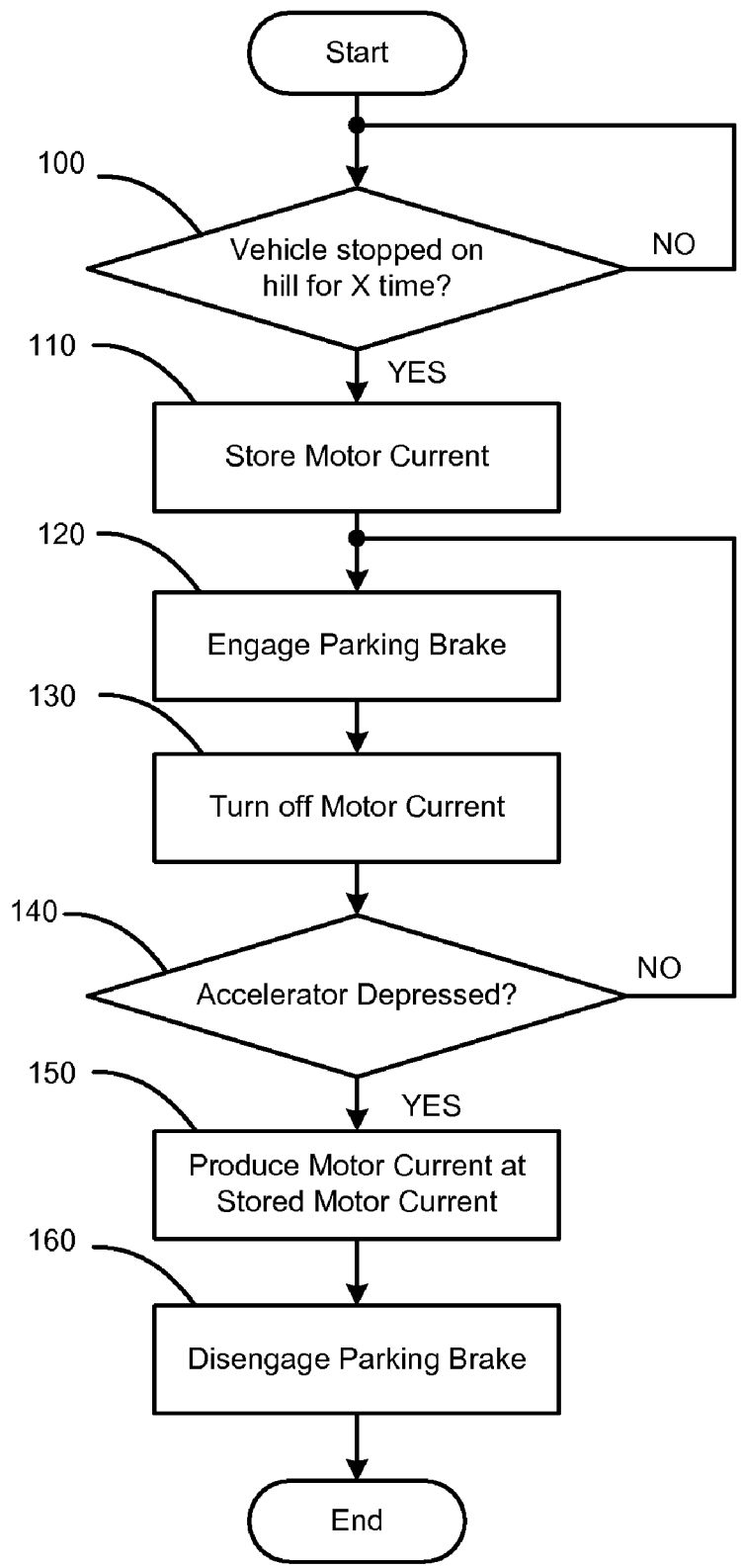
FIG. 2 is a flowchart illustrating a hill hold application as performed by the hill hold system of FIG. 1, in accordance with various embodiments.

Referring now to FIG. 2, a flowchart illustrates various embodiments of a hill hold application as performed by the hill hold system of electric utility vehicle 10, according to various embodiments. If electric utility vehicle 10 is stopped on a hill for a selectable period of time 'X' at 100, a value indicative of motor current necessary to stop the vehicle on the hill is stored in memory at 110. In various embodiments, time period 'X' can range between 0.8 and 2.2 seconds. Otherwise, conditions of the electric utility vehicle 10 are monitored to see if the electric utility vehicle is stopped by motor 12 on a hill at 100. Once electric utility vehicle 10 has been stopped on the hill for time 'X' and the motor current value is stored, the parking brake function of electromechanical brake 38 is engaged at 120. Current supplied to motor 12 is then turned off at 130 to conserve power and to reduce heating in motor 12.

If accelerator signal 30 indicates that accelerator pedal 28 is then depressed at 140, current is commanded to motor 12 at the previously stored motor current at 150 and the parking brake function of the electromechanical brake 38 is disengaged at 160. Otherwise, the parking brake function of the electromechanical brake 38 remains engaged and motor current remains off at 120 and 130 respectively until the accelerator signal 30 indicates that accelerator pedal 28 has become depressed.

In various embodiments, a value indicative of at least one of a voltage, a current, or a power provided to motor 12 to stop electric utility vehicle 10 on the hill is stored. Voltage is then commanded to motor 12 at the stored voltage, current, or power when accelerator pedal 28 is depressed to maintain electric utility vehicle 10 in a stopped state on the hill after the park brake function is disabled or disengaged. In various embodiments, determining whether the electric utility vehicle 10 is stopped on a hill can be based on a vehicle speed or a torque required for maintaining electric utility vehicle 10 at the vehicle speed. In various embodiments, the hill hold application can be performed any time the electric utility vehicle 10 reaches a determined speed. In various embodiments, the hill hold application can be performed when the electric utility vehicle 10 speed reaches zero. The hill hold methods and systems as disclosed prevents the vehicle from rolling back and snapping forward when the accelerator is initially depressed after stopping on a hill.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A system for controlling dynamic braking of an electric utility vehicle, comprising:
    a brake pedal position sensor that generates a brake position signal corresponding to a position of a brake pedal;
    an accelerator position sensor that generates an accelerator signal corresponding to a position of an accelerator pedal; and
    a controller that receives the brake position signal and the accelerator signal and transmits a motor control signal to a motor based on the brake position signal and the accelerator pedal signal, and the controller stores a value indicative of an amount of at least one of current, voltage, and power to maintain electric utility vehicle in a stopped state on the hill after the park brake function is disabled or disengaged when the electric utility vehicle achieves a first predetermined speed, and the controller generates the motor control signal in accordance with the stored value when the accelerator signal indicates a command to increase the speed of the electric utility vehicle above a second predetermined speed.

2. The system of claim 1, the controller configured to store the value indicative of the at least one of the current, voltage, and power when the electric utility vehicle achieves the first speed for a predetermined time period.

3. The system of claim 2, the controller configured to command a parking brake function of an electromechanical brake on and commanding the motor off after storing the value.

4. The system of claim 3, the controller configured to command the parking brake function off after the accelerator signal indicates the command to increase the speed of the electric utility vehicle above the second predetermined speed.

5. The system of claim 2, the predetermined time period being in the range of 0.8 to 2.2 seconds.

6. The system of claim 1, the first predetermined speed is approximately zero.

7. The system of claim 6, the controller configured to store the value based on at least one of a vehicle speed and a torque required to maintain the vehicle at the vehicle speed.

* * * * *